Patented May 19, 1936

2,041,528

UNITED STATES PATENT OFFICE 2,041,528

SAFETY GLASS

Emile Clément Cottet, Lyon, France, assignor to Societe des Usines Chimiques Rhone-Poulenc, Paris, France No Drawing. Application November 24, 1934, Serial No. 754,611. In Great Britain November 27, 1933

1 Claim. (Cl. 49—81)

The present invention relates to an improvement in the method of manufacturing safety glass of the type in which glass plates are assembled, together with a plastic material containing cellulosic derivatives, after one at least of the surfaces which are to be put into contact has been coated with one or more agents which facilitate adhesion, these agents can be either a layer of suitable adhesive material, or a solvent liquid or softener of the plastic material of the sheet.

In working according to all the known processes, whatever be the technique employed for the assemblage and in spite of a subsequent heat treatment under pressure, the adhesion of the component elements of the composite glass was always far from perfect over the whole of the surface of contact, and was always far from being durable. It was frequently found when composite glass so prepared was broken by a violent shock that small particles of glass became unstuck. This defect was particularly noticeable with composite glass which had been in service for a long time.

The object of the present invention is to furnish a method entirely eliminating these faults. According to the present invention these defects are overcome by adding an organic ester of silicic acid to the agent which facilitates the adhesion of the glass plates to the sheet of plastic material. A large number of esters are of course available for this purpose, amongst which may be mentioned methyl silicate, ethyl silicate, butyl silicate, benzyl silicate and others. The quantity of silicic ester to be added can vary within very wide limits; this may be as high as 50 per cent of the agent facilitating the adhesion of the elements of the reinforced glass; but in practice it is advisable not to exceed from 2 to 5% for reasons of economy. In this way one always obtains products having a perfect adhesion. This adhesion, besides, is all the more perfect the fewer the number of carbon atoms there are in the alcohol whose silicate is added to the agent facilitating adhesion.

The present invention enables products of exceptional quality to be obtained. They can be kept for any length of time without becoming unstuck, even after long usage. Hammering of the surface does not cause any small pieces to become unstuck.

The perfect sticking which results from the process of the present invention enables reinforced glass to be used without any "luting" of the edges. Even after a prolonged exposure to extremes of heat and cold and other climatic conditions, no unsticking or any alteration of the edges is to be observed.

The following examples illustrate how the invention may be carried out in practice, but the invention is not limited to any of the details given in these examples, and in particular it is possible to use other temperatures than those given in the examples:

Example 1.—Two plates of glass and a foil having a basis of acetone-soluble cellulose acetate or of nitro cellulose are assembled in a bath consisting of 95% by weight of alcohol of 85° Bé., and 5% by weight of a mixture of equal parts of ethyl-ortho-silicate and butyl-ortho-silicate. After draining, the assemblage is placed between the heated platens of a hydraulic press and submitted during 10 minutes to a temperature of 110° C., under a pressure of 6 kgs. per sq. cm. After cooling down under pressure, a safety glass of superior quality is obtained.

Example 2.—Two plates of glass and a foil having a basis of cellulose acetate preferably treated according to the process of British Patent 361,254, are assembled in a bath consisting of 95% by weight of benzyl alcohol and 5% by weight of ethyl silicate or benzyl silicate. The assemblage is then placed in an autoclave into which air heated to 140° C., and under a pressure of 3,500 kgs. per sq. cm., is introduced for 25 minutes. The safety glass obtained has a perfect adhesion which does not diminish after prolonged usage.

Example 3.—Two plates of glass are covered with a layer of adhesive which is obtained by pouring on an acetone solution containing 10% of a mixture comprising 50 parts of cellulose acetate, 50 parts triacetin and 10 parts of butyl silicate. The acetone is eliminated by drying. The plates thus treated are assembled with a foil of plastic material having a basis of nitrocellulose, by pressing the superimposed elements between the platens of a hydraulic press heated to 90–100° C.

Example 4.—A hot solution consisting of 30 parts of cellulose acetate, 60 parts of triacetin and 10 parts of ethyl silicate is deposited by pouring on the face to be stuck of two plates of glass. The adhesive plastic layer thus formed is allowed to cool. The sheets treated are superimposed with a sheet of plastic material with a base of cellulose acetate, are passed between two pressing rollers, to make sure that the surfaces to be stuck are put into contact, and the assemblage treated just as it is, in an autoclave, during a certain time, to the action of a hot fluid under pressure, for example during 20 minutes at 140° under an air pressure of 3 kg. 500.

What I claim and desire to secure by Letters Patent is:—

As a new article of manufacture a safety glass containing an adhesive layer, one of the constituents of which is an ester of silicic acid.

EMILE CLÉMENT COTTET.